US012201581B2

(12) United States Patent
Jan et al.

(10) Patent No.: US 12,201,581 B2
(45) Date of Patent: Jan. 21, 2025

(54) ROTATABLE FIXING STRUCTURE OF WATER SPRAY DEVICE

(71) Applicant: Foresee Scientech Ltd., Xiushui Township, Changhua County (TW)

(72) Inventors: Danny Jan, Xiushui Township (TW); Cheng-Hsiung Chang, Xiushui Township (TW)

(73) Assignee: Foresee Scientech Ltd., Xiushui Township (TW)

( * ) Notice: Subject to any disclaimer, the term of this patent is extended or adjusted under 35 U.S.C. 154(b) by 162 days.

(21) Appl. No.: 18/171,789

(22) Filed: Feb. 21, 2023

(65) Prior Publication Data

US 2024/0277569 A1 Aug. 22, 2024

(51) Int. Cl.
*A61H 33/00* (2006.01)

(52) U.S. Cl.
CPC .. *A61H 33/6063* (2013.01); *A61H 2201/0115* (2013.01)

(58) Field of Classification Search
CPC .................... A61H 33/6063; A61H 2201/0115
USPC .................................................. 4/541.6, 492
See application file for complete search history.

(56) References Cited

U.S. PATENT DOCUMENTS

| | | | | |
|---|---|---|---|---|
| 10,806,664 | B1 * | 10/2020 | Jan | A61H 35/006 |
| 10,807,115 | B1 * | 10/2020 | Jan | B05B 15/65 |

FOREIGN PATENT DOCUMENTS

| | | | | |
|---|---|---|---|---|
| CN | 212130897 U | * 12/2020 | | F04D 13/0673 |
| CN | 212696428 U | * 3/2021 | | F04D 13/0673 |
| CN | 113245081 A | * 8/2021 | | B05B 11/0086 |
| CN | 118418699 A | * 8/2024 | | F04D 13/0673 |

* cited by examiner

*Primary Examiner* — Lori L Baker
(74) *Attorney, Agent, or Firm* — Demian K. Jackson; Jackson IPG PLLC

(57) ABSTRACT

A rotatable fixing structure of a water spray device, the water spray device contains: a housing. The housing includes a base, a cap, and a cavity. The base has a support sheet and a fence. The support sheet has an internal face and an external face. The internal face of the support sheet has a circular post and a wear resistant washer. The external face has a notch, and the cap has at least one inlet and at least one outlet. An impeller is accommodated in the cavity and includes multiple vanes and a receiving orifice for accommodating the circular post. A reinforced heat conductor is accommodated in the notch. The reinforced heat conductor includes a first segment and a second segment. The first segment extends into the circular post over the internal face of the base, and the second segment is exposed outside the external face.

9 Claims, 12 Drawing Sheets

ROTATABLE FIXING STRUCTURE OF WATER SPRAY DEVICE

TECHNICAL FIELD

The present invention relates to a water spray device, and more particularly to a rotatable fixing structure of the water spray device.

BACKGROUND

With the advancement of times and the improvement of living standards, it is increasingly popular for a foot tub and a massage bathtub to have massage spa function. A conventional water spray device is fixed on a wall of the foot tub and the massage bathtub so as to draw water from the foot tub and the massage bathtub, and the water is pressurized to spray out of water column strongly, thus massaging a user to improve blood circulation and metabolism and to dredge the meridians.

With reference to FIGS. 10-12, a conventional water spray device contains a motor set 80 and a spraying assembly 90. The motor set 80 includes a motor 81 and a fixer 82, wherein the motor 81 has a rotary shaft 811 extending from a front end thereof, and the motor 81 has a first magnetic attraction element 812 connected thereon. The fixer 82 is mounted on the front end of the motor 81 and covers the rotary shaft 811 and the first magnetic attraction element 812, wherein the fixer 82 is configured to fix the motor set 80 on a wall of the foot tub or a massage bathtub. The spraying assembly 90 includes a housing 91, a post unit 92, and an impeller 93. The housing 91 has a base 91A, a cap 91B connected with the base 91A, and a cavity 911 defined between the base 91A and the cap 91B. The cap 91B has at least one inlet 912 and at least one outlet 913 which communicate with the cavity 911. The rod unit 92 is comprised of a shaft 921, an annular sheet 922, a circular fitting element 923, an internal bushing 924, an external bushing 925, and a screw nut 926. The shaft 921 is received in the base 91A, the annular sheet 922 is inserted by the shaft 921, the circular fitting element 923 is fitted on an outer wall of the shaft 921, the internal bushing 924 is fitted on an outer wall of the circular fitting element 923, the external bushing 925 is fitted on an outer wall of the internal bushing 924, and the screw nut 926 is screwed on the shaft 921. Furthermore, the impeller 93 is accommodated in the cavity 911 and includes multiple vanes 931 radially extending to a side of the cap 91B. The impeller 93 has a through orifice 932 defined on a center thereof and fitted on an outer wall of the external bushing 925, wherein the impeller 93 further includes a second magnetic attraction element 933 configured to attract with the first magnetic attraction element 812 magnetically to produce a magnetic field so that the spraying assembly 90 is magnetically attracted with the motor set 80, and the rotary shaft 811 of the motor 81 actuates the impeller 93 to rotate via the magnetic field.

In operation, the impeller 93 rotates to draw and actuate the water to flow into the cavity 911 of the housing 91 via the at least one inlet 912 of the cap 91B, wherein the water is pressurized by rotating the impeller 93 and is sprayed out of the at least one outlet 913 of the cap 91B in a water column shape, thus massaging the user strongly.

However, the rod unit 92 of the spraying assembly 90 of the conventional spray device is comprised of the shaft 921, the annular sheet 922, the circular fitting element 923, the internal bushing 924, the external bushing 925, and the screw nut 926. Thus, the spraying assembly 90 is complicated, manufactured troublesomely, and has high fabrication costs. When the spraying assembly 90 drops on a ground carelessly, an impact of the housing 91 transmits to the shaft 921, thus breaking the shaft 921. Furthermore, the shaft 921 causes fracture and malfunction because of overheating after a period of use time.

The present invention has arisen to mitigate and/or obviate the afore-described disadvantages.

SUMMARY

The primary aspect of the present invention is to provide a rotatable fixing structure of a water spray device by which the spraying assembly is simplified, manufactured easily at a low fabrication cost, reinforced and has efficient heat dissipation; and the spraying assembly is not dropped on a ground often to reduce damage and malfunction.

Another aspect of the present invention is to provide a rotatable fixing structure of a water spray device by which when the bushing, the wear resistant washer and the base rotate together, it is easy to obtain an outstanding lubrication and an efficient heat dissipation, and when the water spray device burns idly for thirty minutes, the impeller and the circular post are not damaged.

To obtain above-mentioned aspects, a rotatable fixing structure of a water spray device is provided by the present invention, the water spray device contains: a housing. The housing includes a base, a cap connected with the base, and a cavity defined between the base and the cap. The base is made of heat dissipation material, the base has a support sheet formed thereon, the support sheet has an internal face facing the cap, and the support sheet has an external face back to the cap. The internal face of the support sheet has a circular post integrally extending from a center of the internal face, a wear resistant washer covered, injection molded around, and exposed outside the circular post of the internal face. The external face of the base has a notch defined on the center of the external face and extending to the circular post, the cap has at least one inlet and at least one outlet which communicates with the cavity, and the base has a fence extending to the cap from a peripheral side of the base.

An impeller is accommodated in the cavity and includes multiple vanes extending to a side of the cap. The impeller includes a receiving orifice defined on a center thereof and configured to accommodate the circular post, and the impeller back to a side of the cap rotatably contacts with the wear resistant washer.

A reinforced heat conductor is accommodated in the notch of the base. The reinforced heat conductor includes a first segment and a second segment. The first segment extends into the circular post over the internal face of the base, and the second segment is exposed outside the external face of the base.

DETAILED DESCRIPTION

Figure 1:
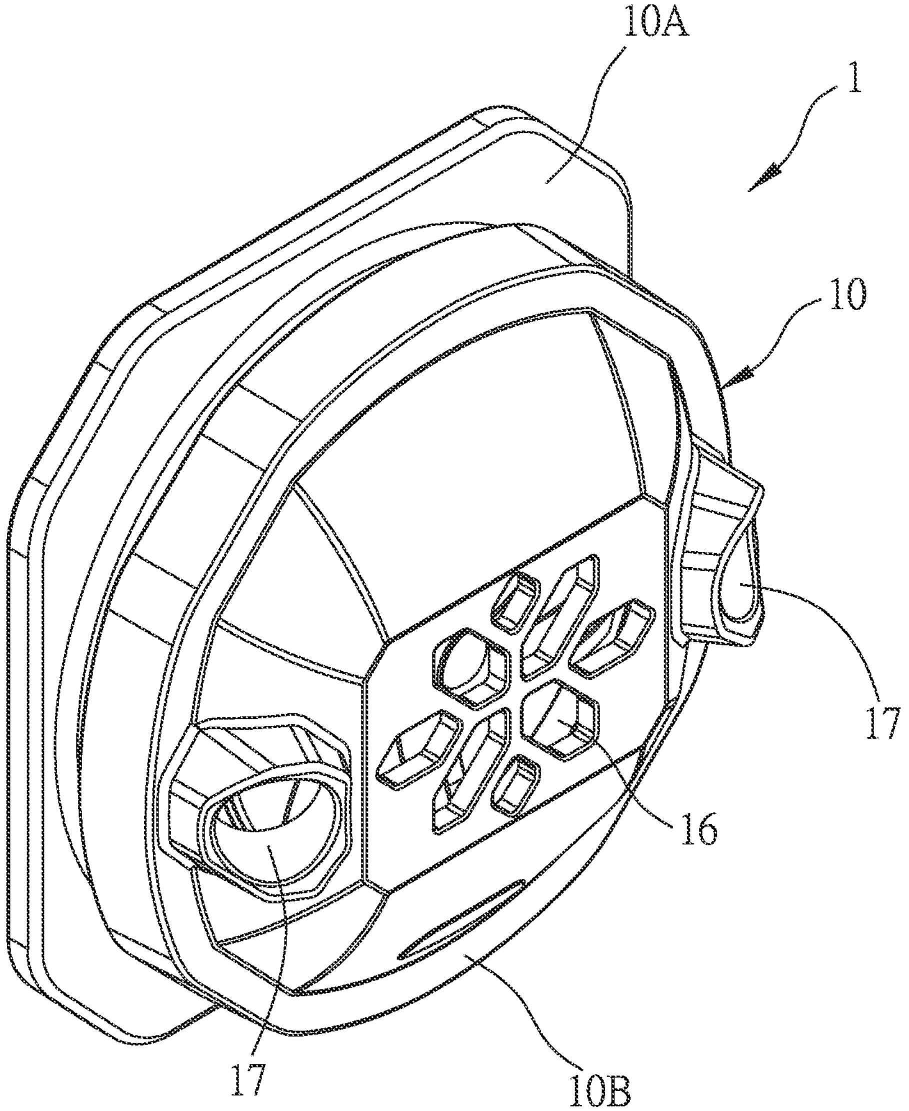
FIG. 1 is a perspective view showing the assembly of a spraying assembly of a rotatable fixing structure of a water spray device according to a preferred embodiment of the present invention.
Figure 2:
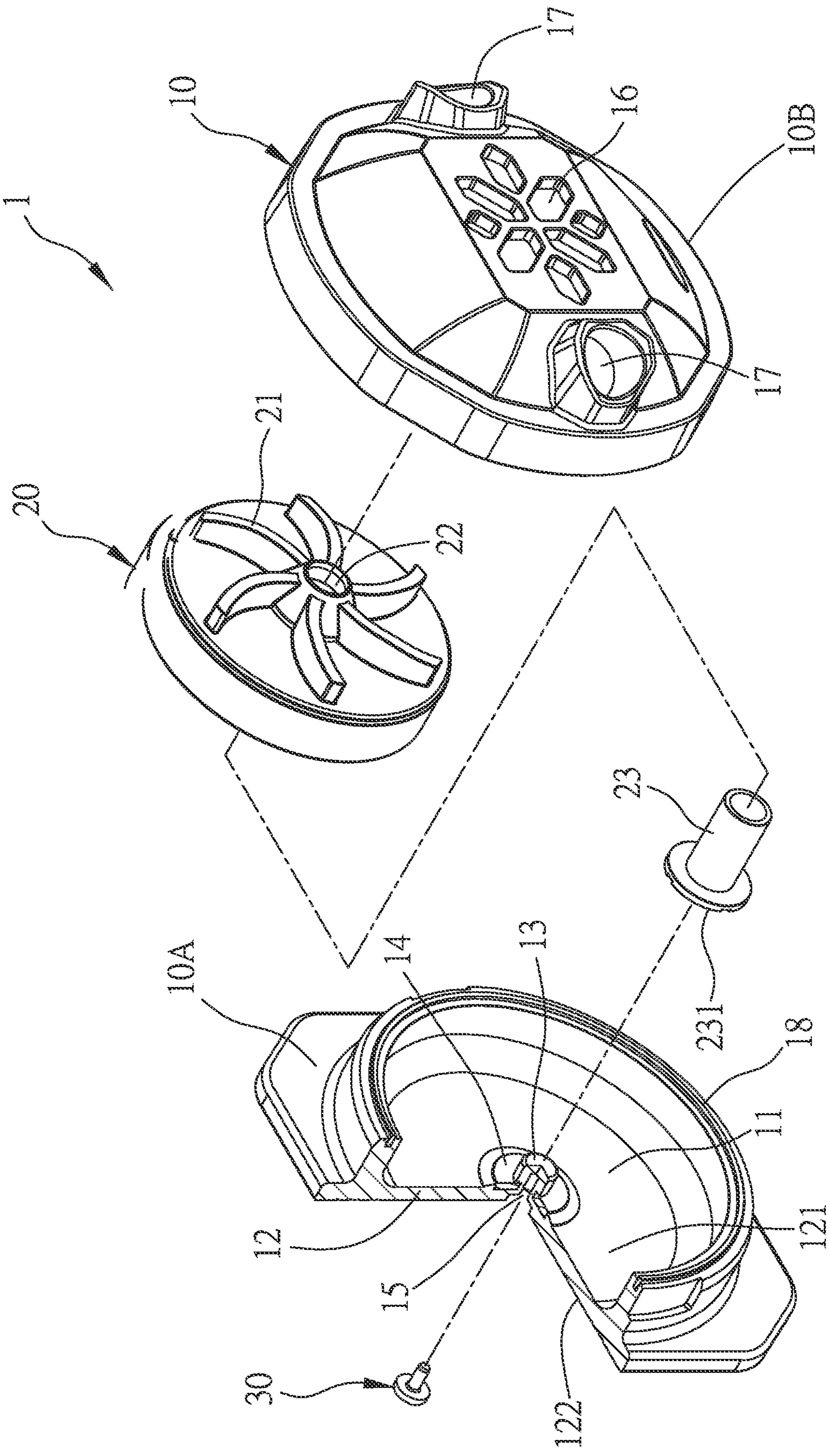
FIG. 2 is a perspective view showing the exploded components of the spraying assembly of the rotatable fixing structure of the water spray device according to the preferred embodiment of the present invention.
Figure 3:
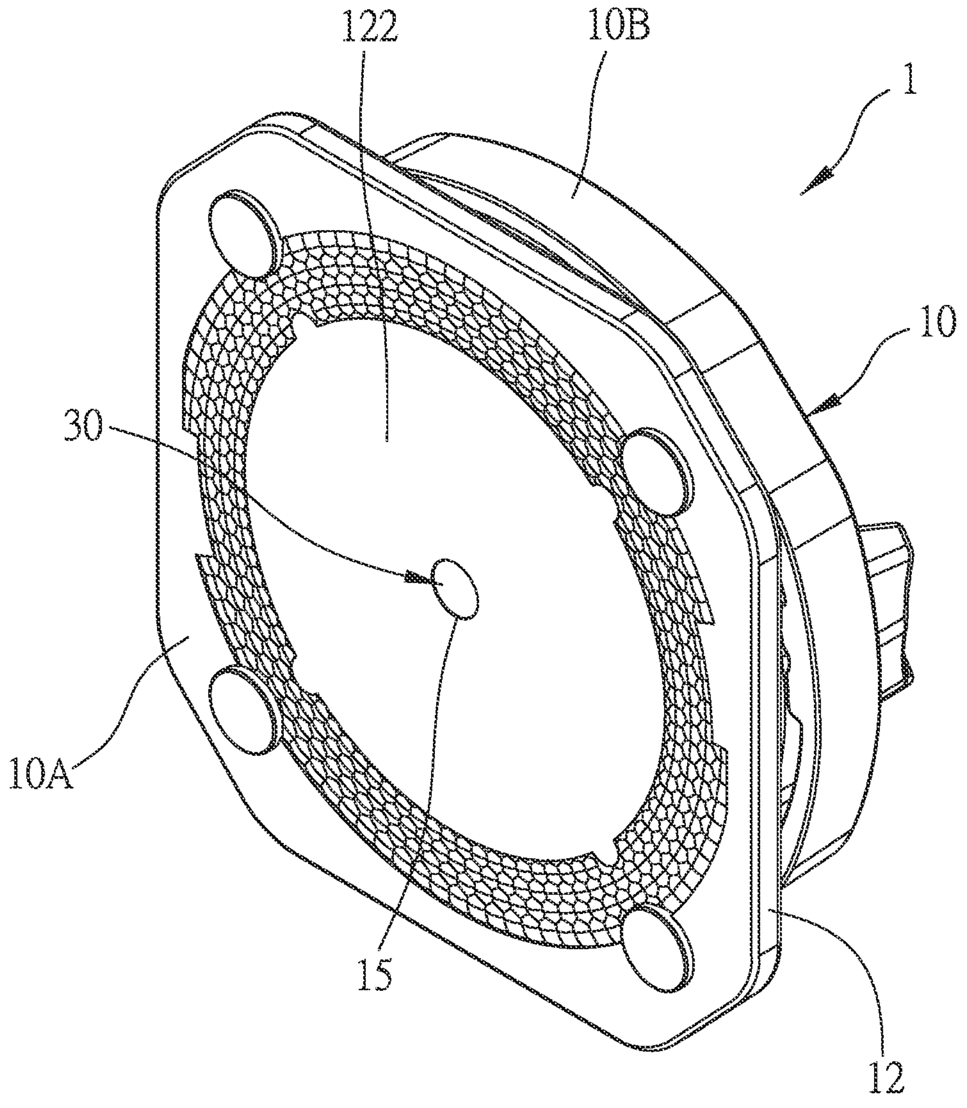
FIG. 3 is another perspective view showing the assembly of the spraying assembly of the rotatable fixing structure of the water spray device according to the preferred embodiment of the present invention.
Figure 4:
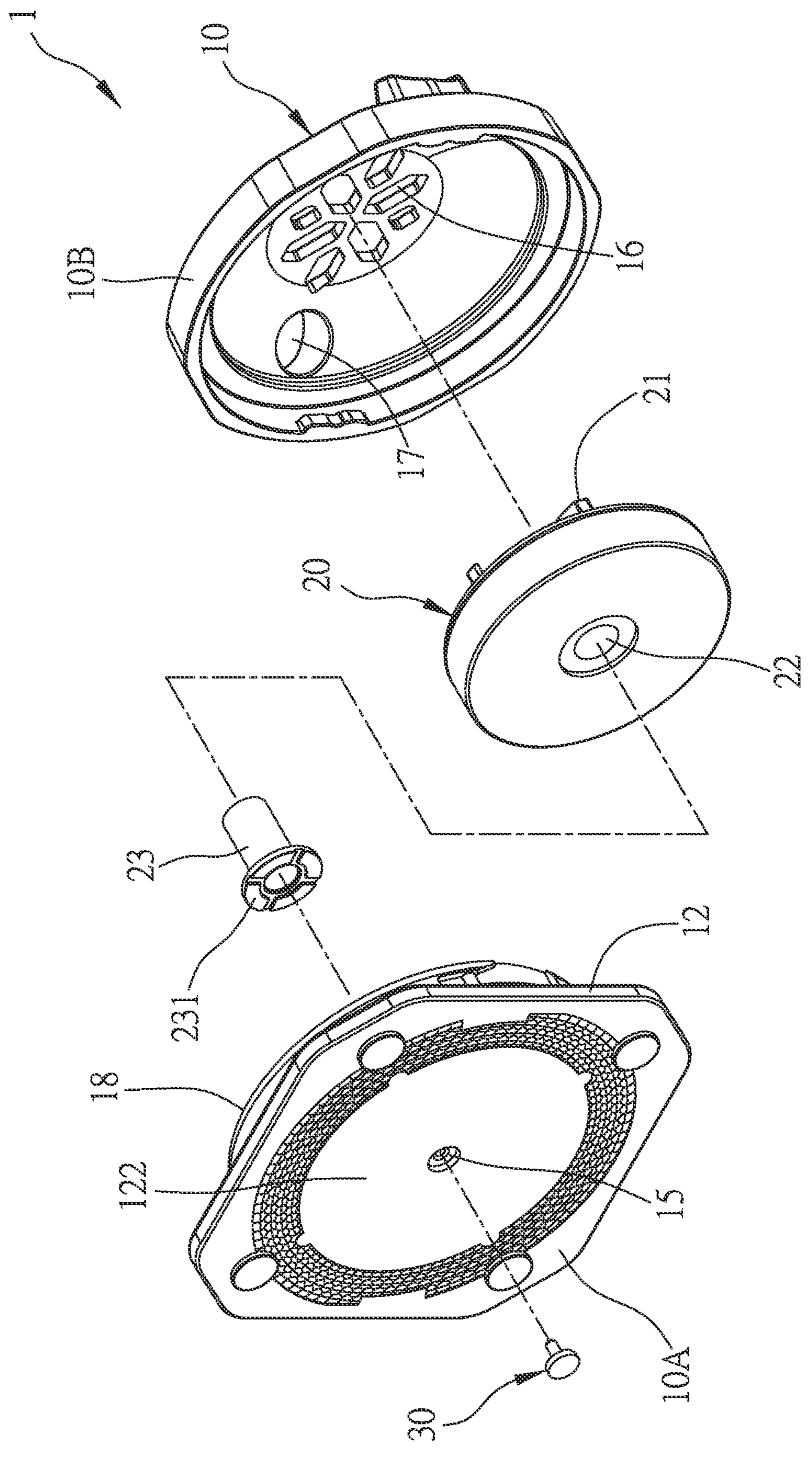
FIG. 4 is another perspective view showing the exploded components of the spraying assembly of the rotatable fixing structure of the water spray device according to the preferred embodiment of the present invention.
Figure 5:
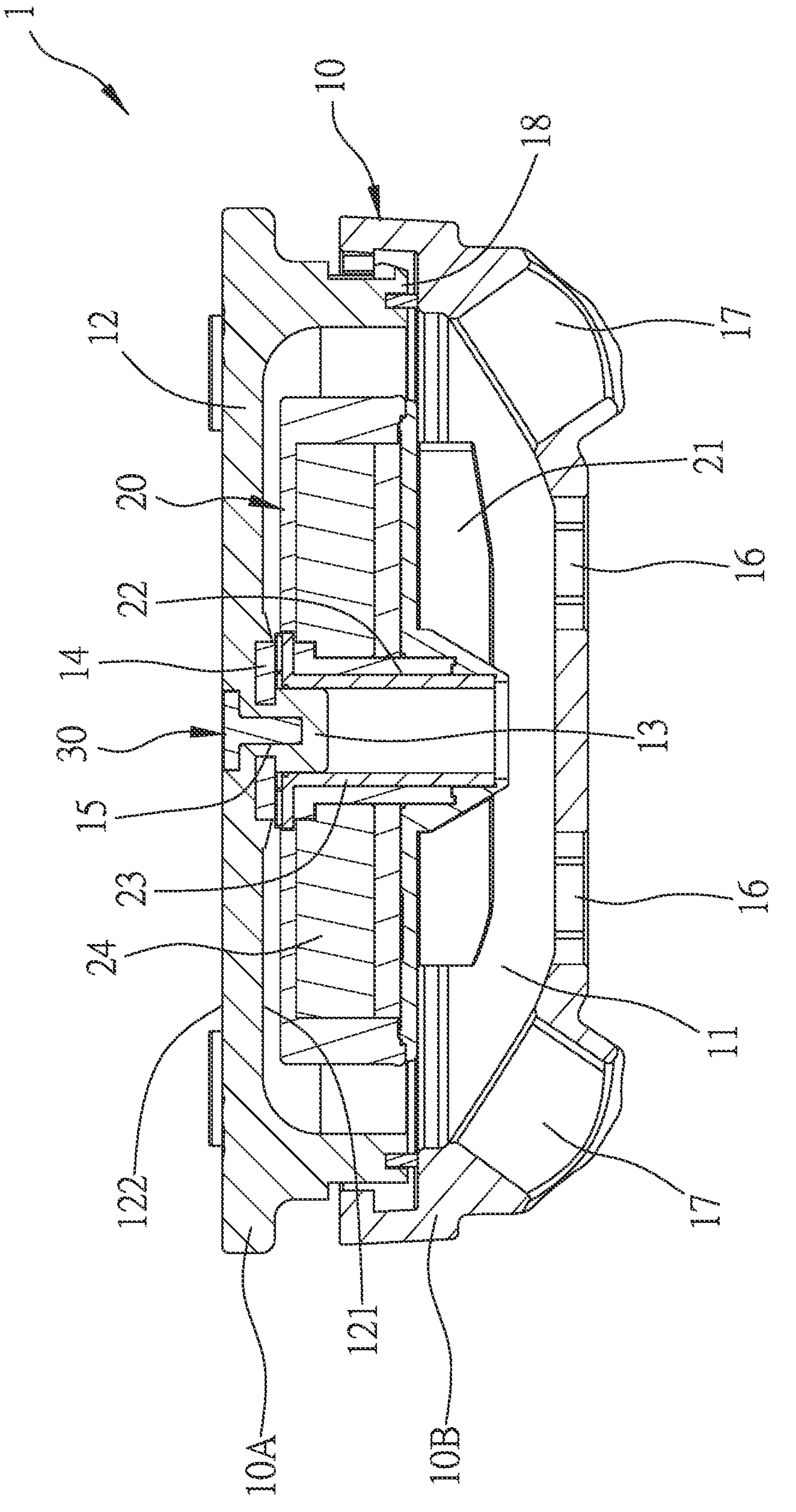
FIG. 5 is a cross sectional view showing the assembly of the spraying assembly of the rotatable fixing structure of the water spray device according to the preferred embodiment of the present invention.
Figure 6:
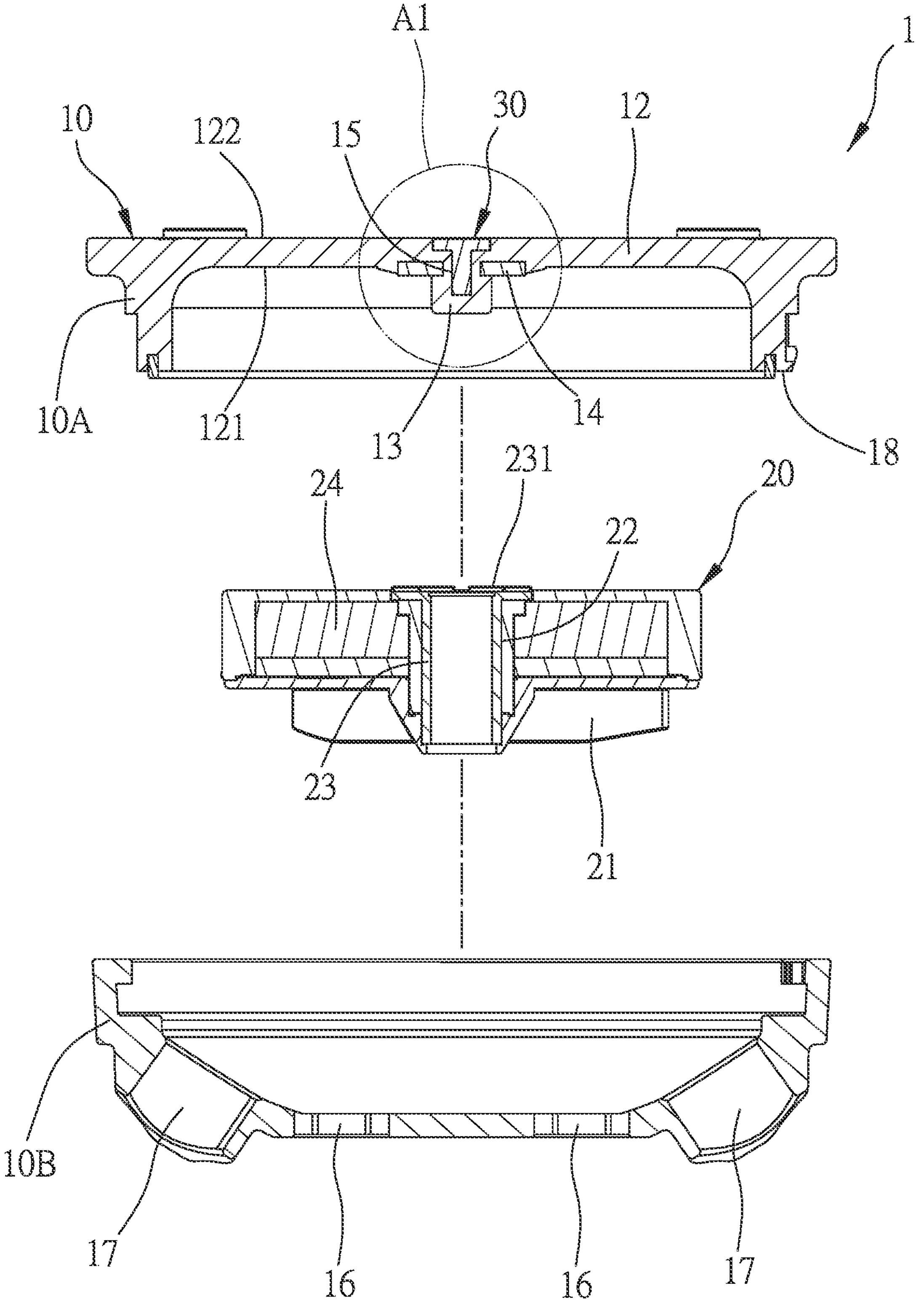
FIG. 6 is a cross sectional view showing the exploded components of the spraying assembly of the rotatable fixing structure of the water spray device according to the preferred embodiment of the present invention.
Figure 7:
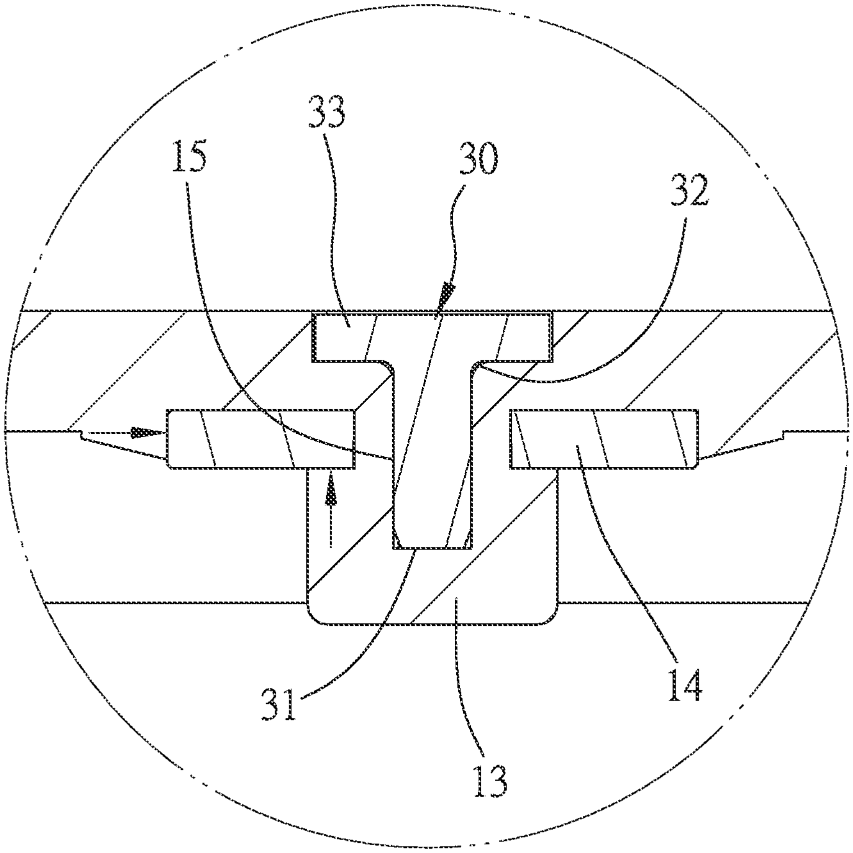
FIG. 7 is an amplified cross sectional view of a portion A1 of FIG. 6.

With reference to FIGS. 1-7, a rotatable fixing structure of a water spray device according to a preferred embodiment of the present invention, the water spray device comprises: a spraying assembly 1, and the spraying assembly 1 includes a housing 10, an impeller 20, and a reinforced heat conductor 30.

The housing 10 includes a base 10A, a cap 10B connected with the base 10A, a cavity 11 defined between the base 10A and the cap 10B, and a support sheet 12 formed on the base 10A, wherein the support sheet 12 has an internal face 121 facing the cap 10B, and the support sheet 12 has an external face 122 back to the cap 10B, wherein the internal face 121 of the support sheet 12 has a circular post 13 integrally extending from a center of the internal face 121, a wear resistant washer 14 covered and injection molded around and exposed outside the circular post 13 of the internal face 121, wherein the wear resistant washer 14 is formed in a ring shape, made of ceramics, partially pressed to the support sheet 12 by the circular post 13 and partially pushed to the circular post 13 by the support sheet 12. The external face 122 of the support sheet 12 has a notch 15 defined on a center of the external face 122 and extends to the circular post 13. The cap 10B has at least one inlet 16 and at least one outlet 17 which communicates with the cavity 11. In this embodiment, the cap 10B has two inlets 16 defined on the center thereof and communicating with the cavity 11, and the cap 10B further has two outlets 16 defined adjacent to a peripheral side of the cap 10B, communicating with the two cavity 11, and located opposite to the two outlets 17. The base 10A has a fence 18 extending to the cap 10B from a peripheral side of the base 10A, wherein a height of the circular post 13 is lower than a height of the fence 18, and the height of the circular post 13 is lower than a half of the height of the fence 18.

The impeller 20 is accommodated in the cavity 11 and includes multiple vanes 21 radially extending to a side of the cap 10B, wherein the impeller 20 includes a receiving orifice 22 defined on a center thereof and configured to accommodate a bushing 23, wherein the bushing 23 is made of graphite to enhance lubrication and heat dissipation, thus avoiding burning damage, and the bushing 23 has multiple ribs 231 extending from an end thereof and facing the support sheet 12 so as to enhance water discharge, when the impeller 20 rotates. The circular post 13 is received in the receiving orifice 22 of the impeller 20 via the bushing 23, and the multiple ribs 231 of the bushing 23 back to the cap 10B rotatably contacts with the wear resistant washer 14 to reduce an interfered friction area.

The reinforced heat conductor 30 is made of metal and is covered and injection molded or accommodated in the notch 15 of the base 10A, wherein the reinforced heat conductor 30 includes a first segment 31 and a second segment 32, the first segment 31 extends into the circular post 13 over the internal face 121 of the base 10A to reinforce the circular post 13, thus avoiding a fracture of the circular post 13. The second segment 32 has an expanded extension 33 exposed outside the external face 122 of the base 10A to increase a heat dissipated area, thus enhancing a cooling effect. A speed of the heat dissipation of the reinforced heat conductor 30 is higher than a speed of the heat dissipation of the base 10A.

Figure 8:
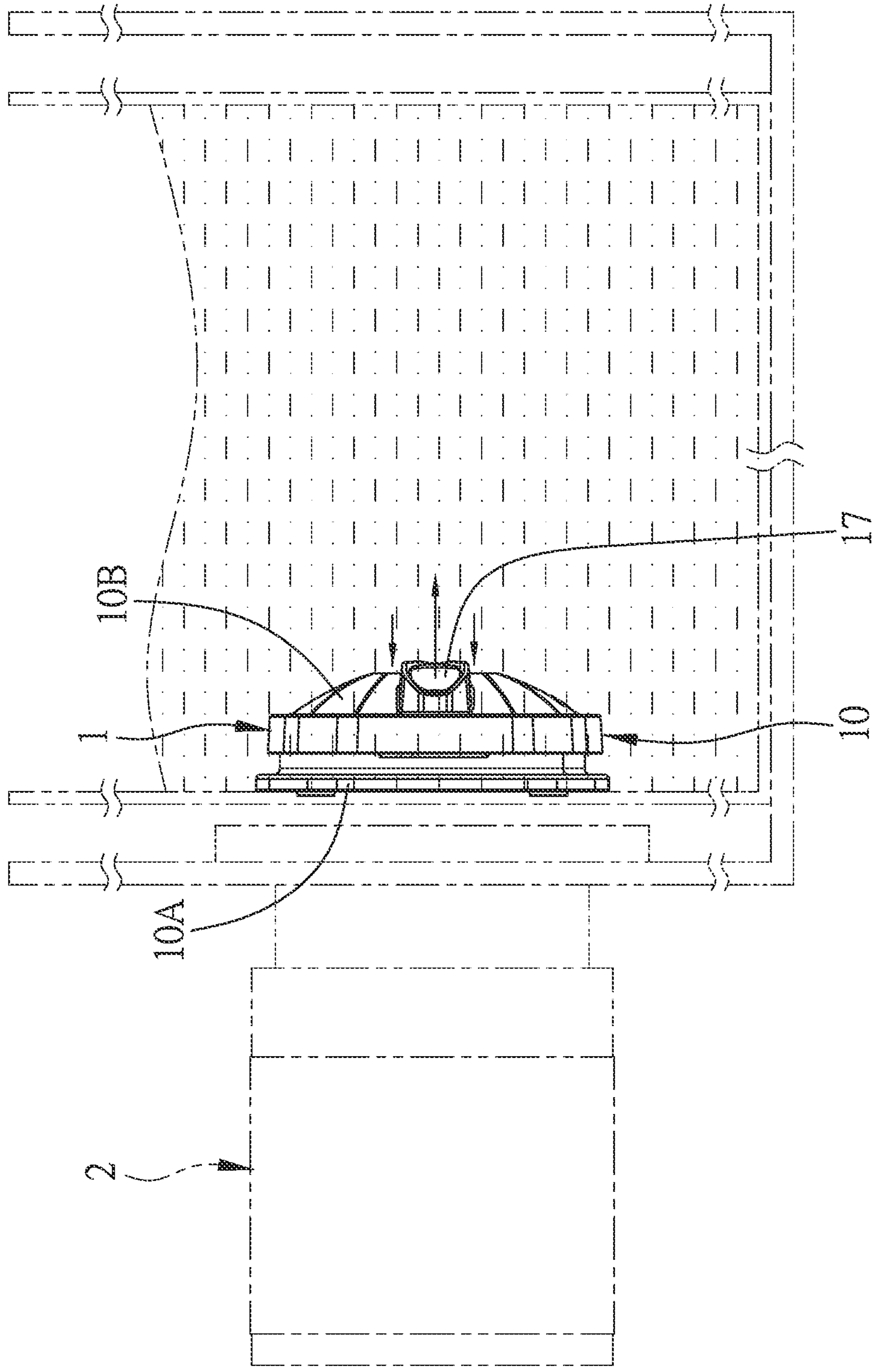
FIG. 8 is a schematic view showing the application of the water spray device.
Figure 9:
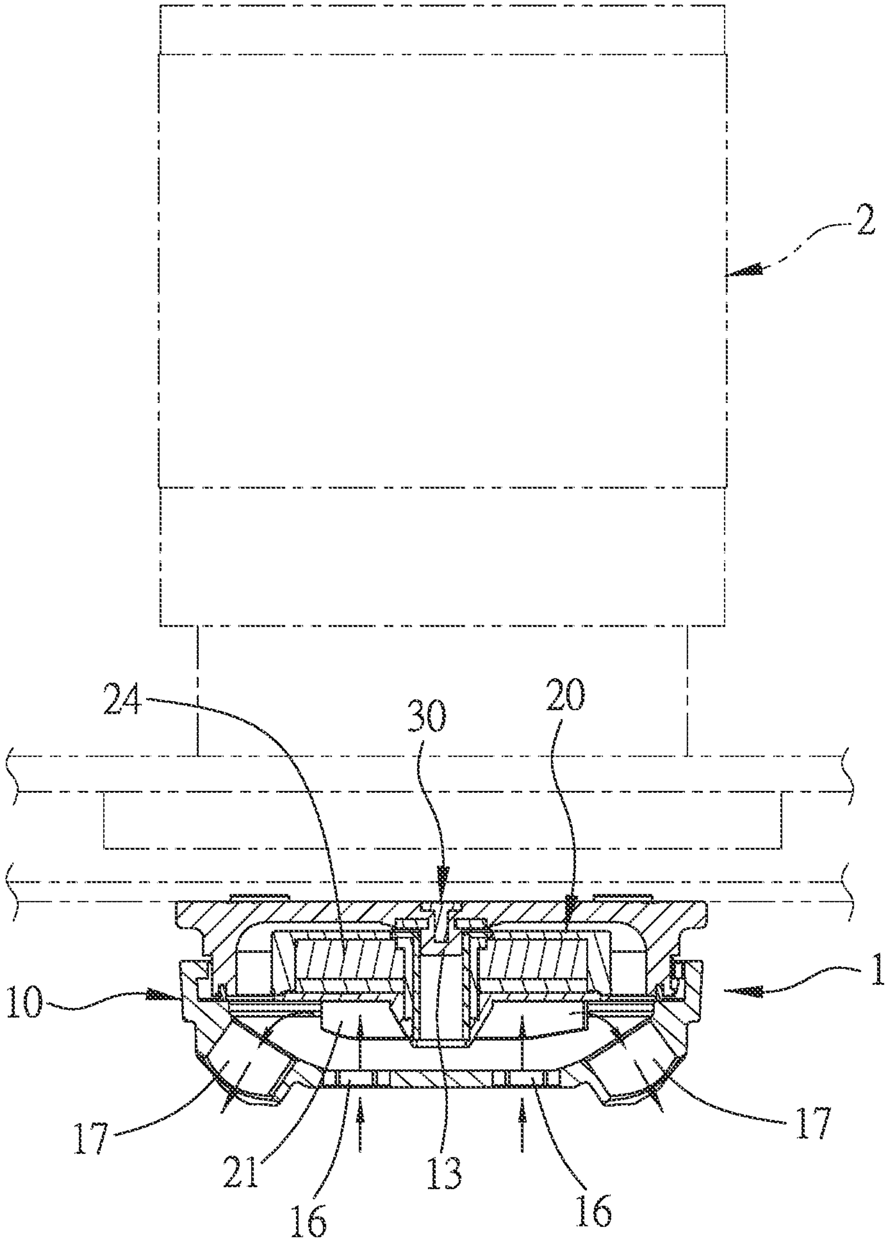
FIG. 9 is a cross sectional view showing the application of the water spray device.
Figure 10:
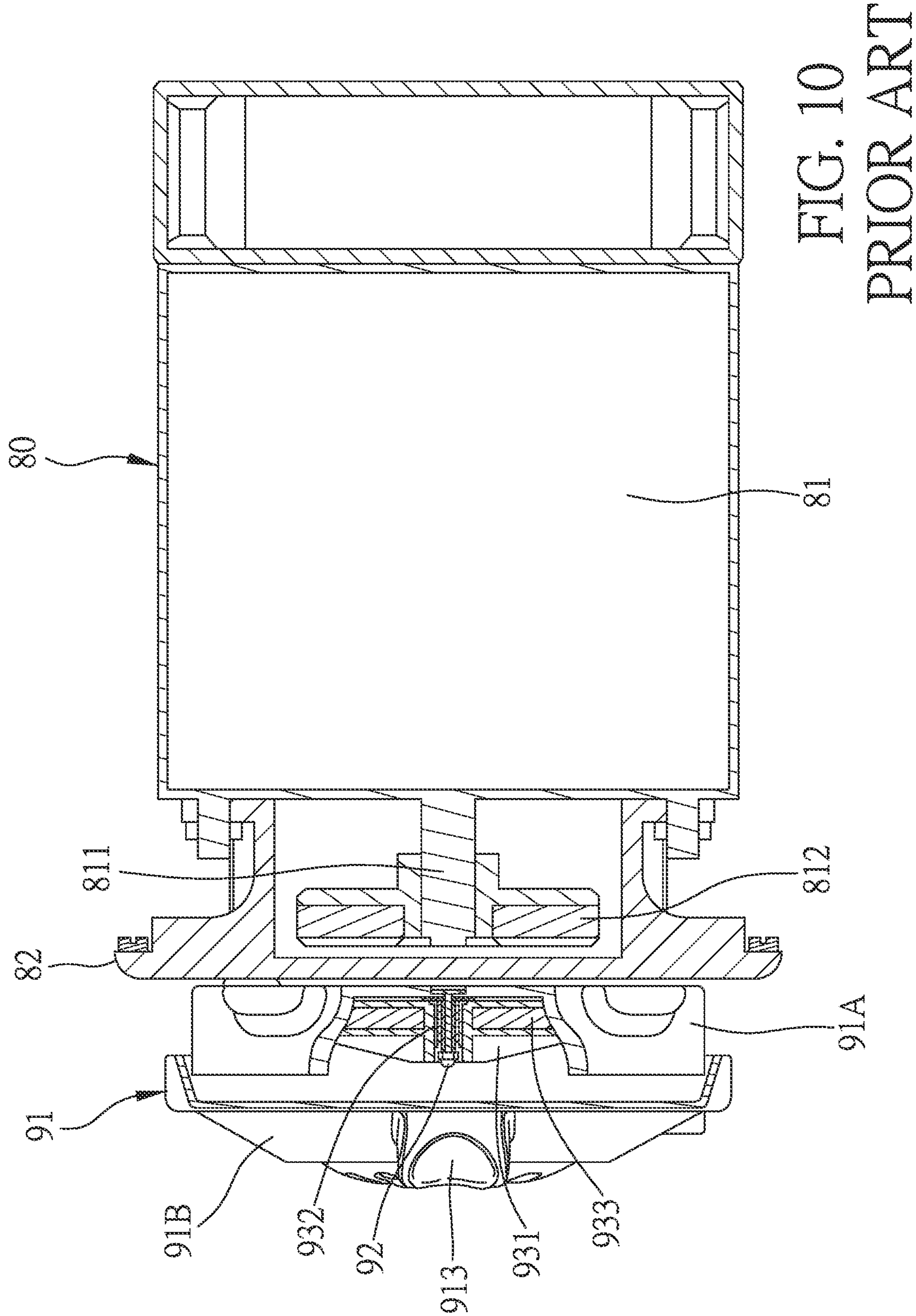
FIG. 10 PRIOR ART
FIG. 10 is a cross sectional view of a conventional water spray device.
Figure 11:
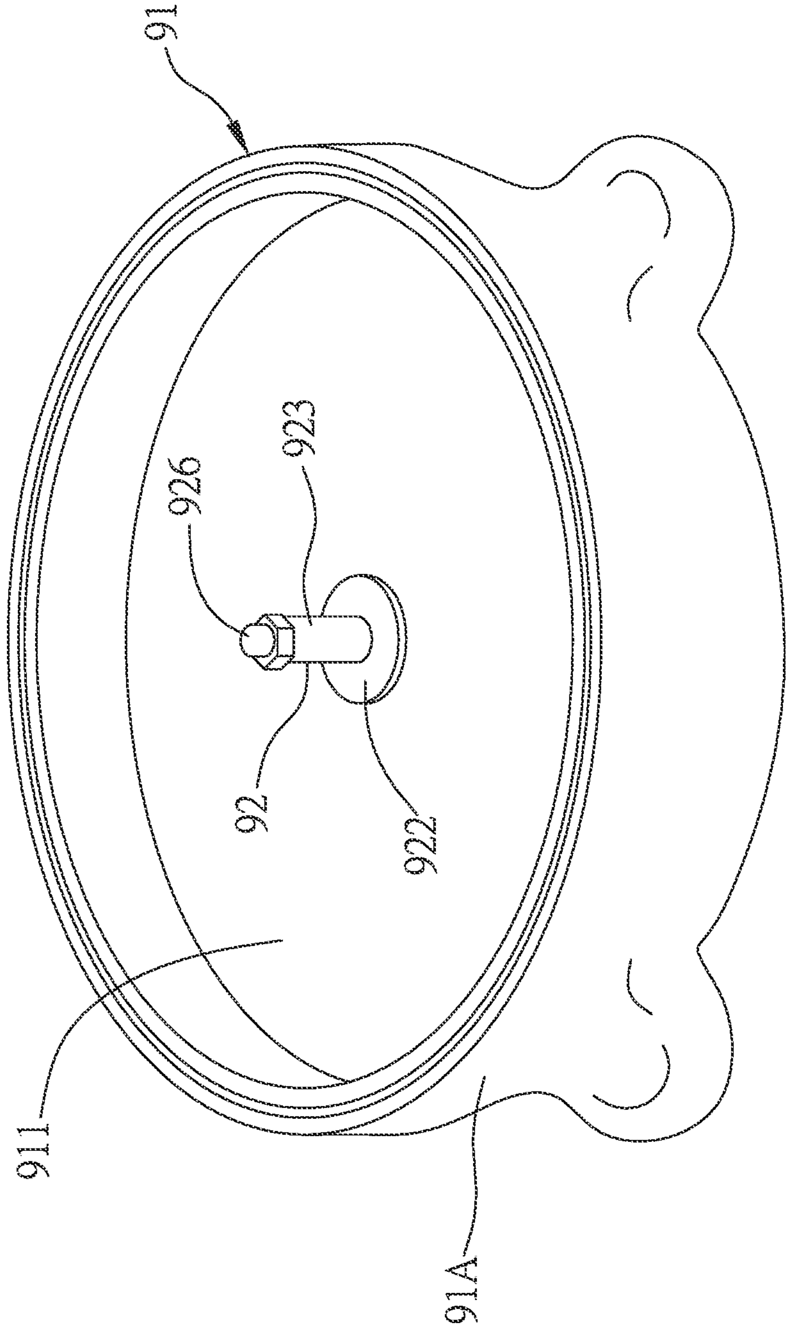
FIG. 11 PRIOR ART
FIG. 11 is a perspective view showing the assembly of a part of the conventional water spray device.
Figure 12:
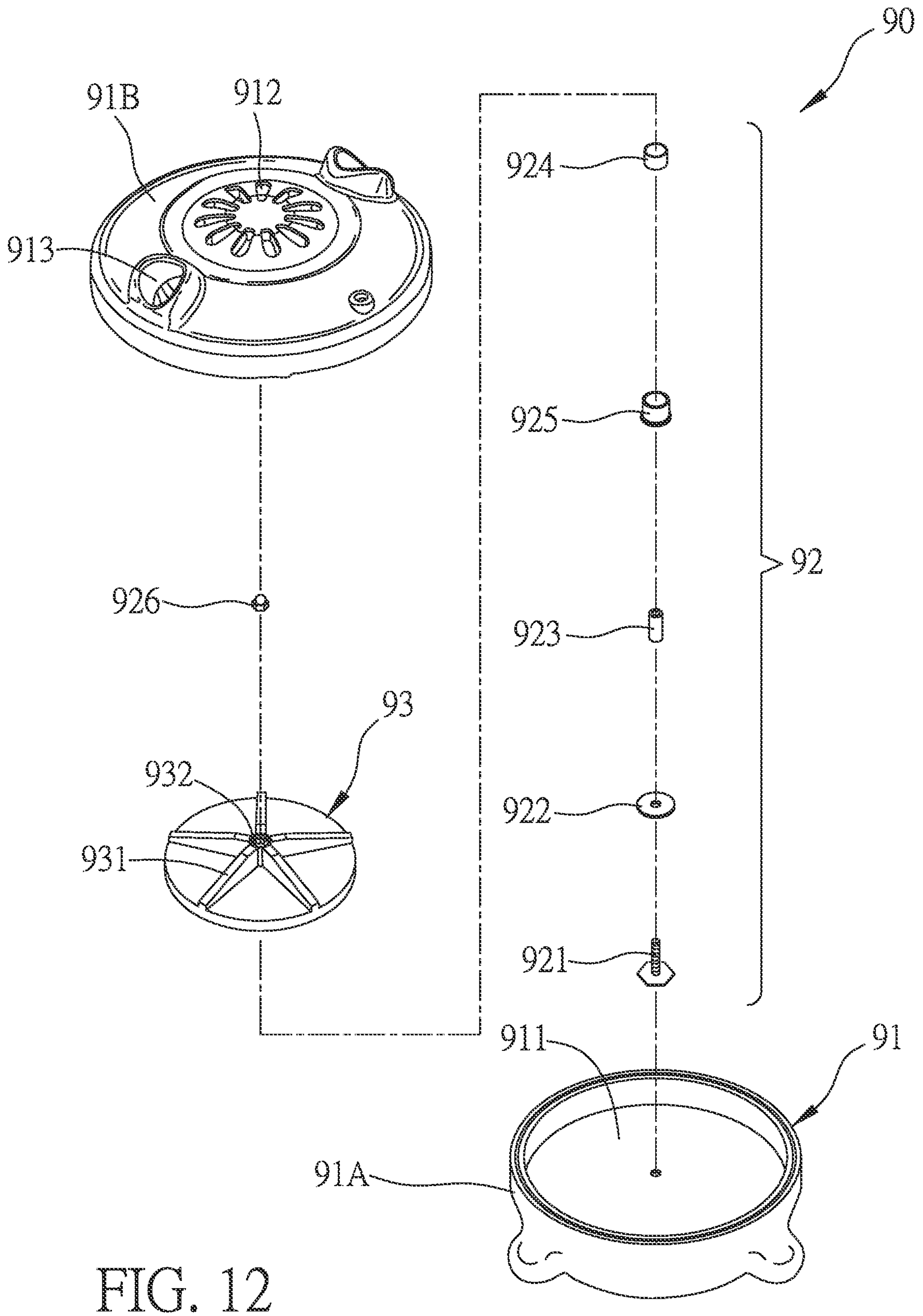
FIG. 12 PRIOR ART
FIG. 12 is a perspective view showing the exploded components of a spraying assembly of the conventional water spray device.

Referring to FIGS. 8 and 9, in operation, the spraying assembly 1 mates with a motor set 2 disposed on an inner wall of a foot tub or a massage bathtub. The impeller 20 further includes a magnetic attraction element 24 configured to magnetically attract the motor set 2, producing a magnetic field, and the spraying assembly 1 is attracted with the motor set 2 in the foot tub or the massage bathtub, wherein the motor set 2 actuates the impeller 20 to rotate via the magnetic field so that the impeller 20 rotates water and the water is drawn into the cavity 11 of the housing 10 via the at least one inlet 16 of the cap 10B. Thereafter, the impeller 20 rotatably pressurizes the water so that the water sprays out of the at least one outlet 17 of the cap 10B in a column shape, thus massaging a user in the foot tub or the massage bathtub.

Thereby, the rotatable fixing structure of the water spray device has advantages as follows:

The circular post 13 is integrally extended from the base 10A, the wear resistant washer 14 is covered and injection molded around the circular post 13, wherein the external face 122 of the base 10A has the notch 15 defined on the center of the external face 122 and extending to the circular post 13, and the reinforced heat conductor 30 is accommodated in the notch 15, such that the spraying assembly 1 is simplified, manufactured easily at a low fabrication cost, reinforced and has efficient heat dissipation. In addition, the spraying assembly 1 is not dropped on the ground often to reduce damage and malfunction.

The bushing 23 is made of graphite so as to enhance the heat dissipation when the bushing 23, the wear resistant washer 12, and the base 10A rotate together to obtain outstanding lubrication and efficient heat dissipation. When the water spray device burns idly for thirty minutes, the impeller 20 and the circular post 13 are not damaged.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A rotatable fixing structure of a water spray device, the water spray device comprises:

a housing, and the housing including a base, a cap connected with the base, and a cavity defined between the base and the cap, wherein the base is made of heat dissipation material, the base has a support sheet formed thereon, the support sheet has an internal face facing the cap, and the support sheet has an external face back to the cap, wherein the internal face of the support sheet has a circular post integrally extending from a center of the internal face, a wear resistant washer exposed outside the circular post of the internal face, wherein the external face of the base has a notch defined on the center of the external face and extending to the circular post, the cap has at least one inlet and at least one outlet which communicate with the cavity, and the base has a fence extending to the cap from a peripheral side of the base;

an impeller accommodated in the cavity and including multiple vanes extending to a side of the cap, wherein the impeller includes a receiving orifice defined on a center thereof and configured to accommodate the circular post, and the impeller back to a side of the cap rotatably contacts with the wear resistant washer; and a reinforced heat conductor accommodated in the notch of the base, wherein the reinforced heat conductor includes a first segment and a second segment, the first segment extends into the circular post over the internal face of the base, and the second segment is exposed outside the external face of the base.

2. The rotatable fixing structure of the water spray device as claimed in claim 1, wherein the wear resistant washer is covered and injection molded around the internal face of the base, wherein the wear resistant washer is partially pressed to the support sheet by the circular post and is partially pushed to the circular post by the support sheet.

3. The rotatable fixing structure of the water spray device as claimed in claim 1, wherein the wear resistant washer is formed in a ring shape and is made of ceramics.

4. The rotatable fixing structure of the water spray device as claimed in claim 2, wherein the wear resistant washer is formed in a ring shape and is made of ceramics.

5. The rotatable fixing structure of the water spray device as claimed in claim 1, wherein the receiving orifice of the impeller accommodates a bushing, and the bushing has multiple ribs extending from an end thereof and facing the support sheet, wherein the circular post is received in the receiving orifice of the impeller via the bushing, and the multiple ribs of the bushing back to the cap rotatably contacts with the wear resistant washer.

6. The rotatable fixing structure of the water spray device as claimed in claim 1, wherein the reinforced heat conductor is made of metal.

7. The rotatable fixing structure of the water spray device as claimed in claim 1, wherein a height of the circular post is lower than a height of the fence, and the height of the circular post is lower than a half of the height of the fence.

8. The rotatable fixing structure of the water spray device as claimed in claim 1, wherein the second segment of the reinforced heat conductor has an expanded extension exposed outside the external face of the base.

9. The rotatable fixing structure of the water spray device as claimed in claim 1, wherein a speed of a heat dissipation of the reinforced heat conductor is higher than a speed of a heat dissipation of the base.

* * * * *